Figure 4:
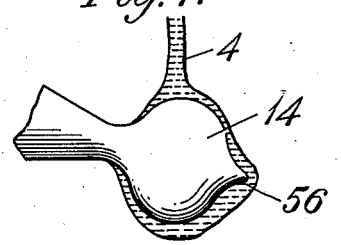
Figure 5:
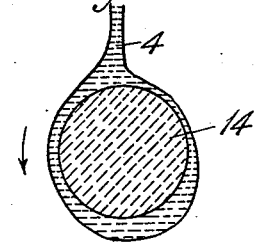

Aug. 19, 1930. K. E. PEILER 1,773,544
ART OF FEEDING MOLTEN GLASS
Original Filed Aug. 3, 1912 3 Sheets-Sheet 1
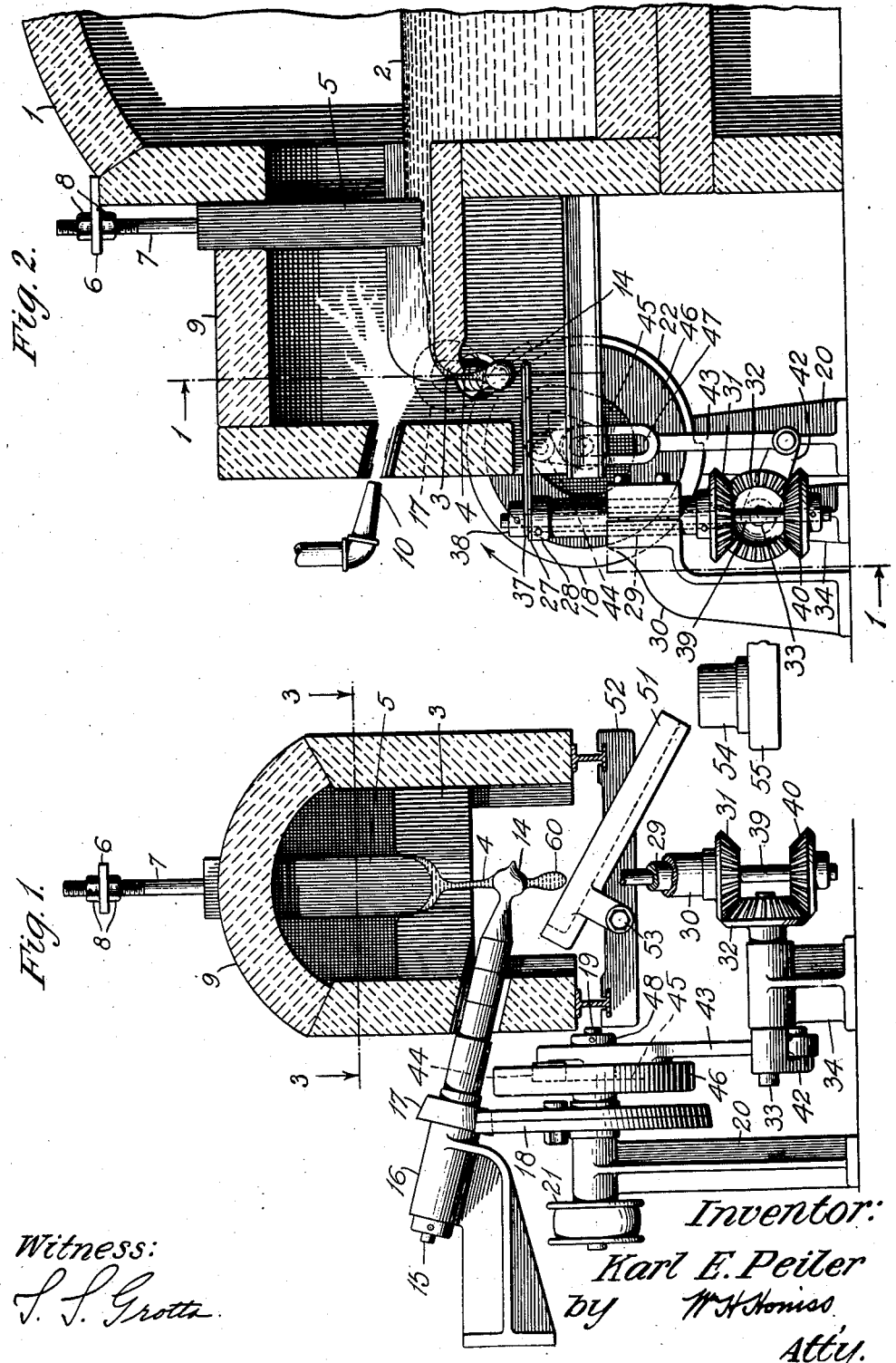
Witness:
S. S. Grotta
Inventor:
Karl E. Peiler
by W. H. Honiss
Atty.

Aug. 19, 1930.  K. E. PEILER  1,773,544
ART OF FEEDING MOLTEN GLASS
Original Filed Aug. 3, 1912  3 Sheets-Sheet 2
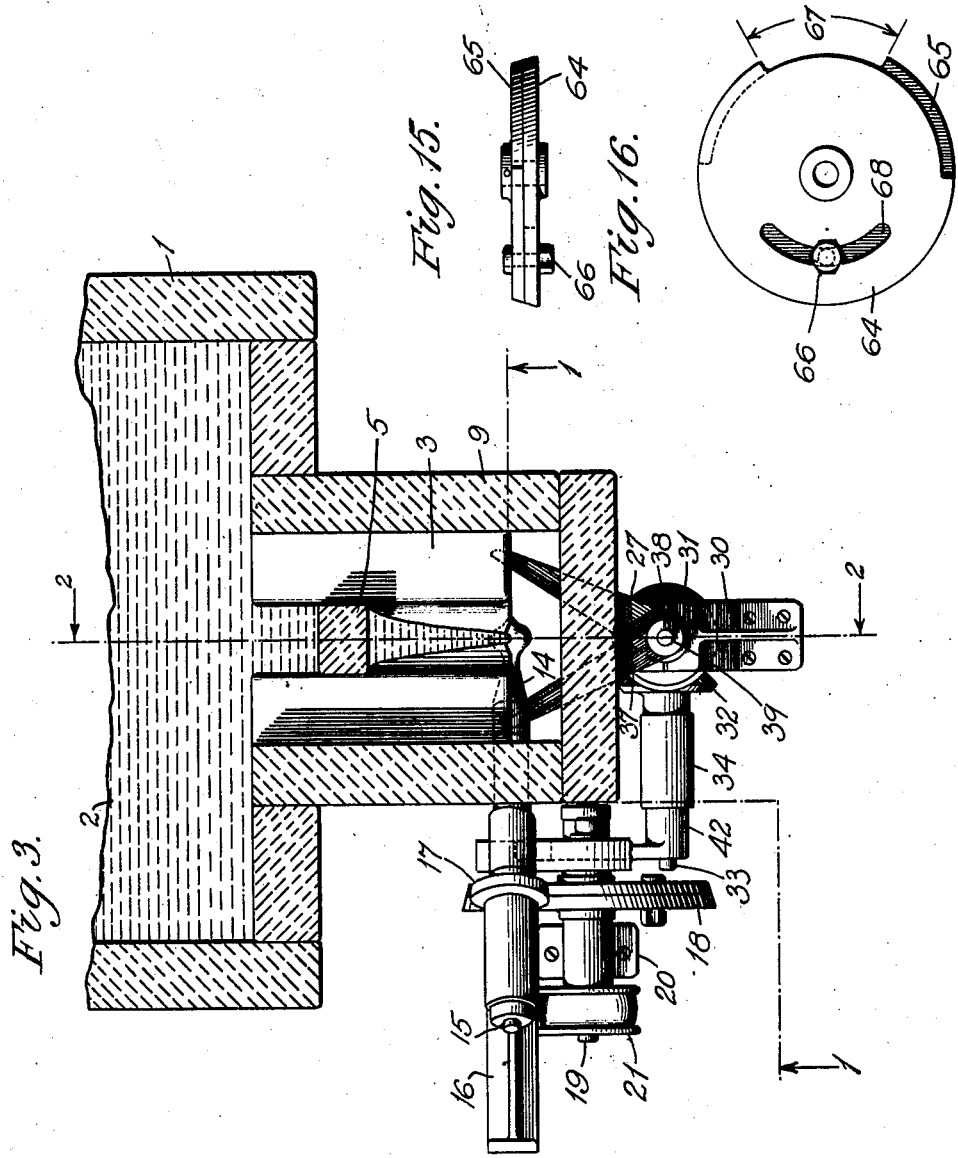
Witness:
S. S. Grotta
Inventor:
Karl E. Peiler
by W. H. Honiss
Atty.

Aug. 19, 1930. K. E. PEILER 1,773,544
ART OF FEEDING MOLTEN GLASS
Original Filed Aug. 3, 1912   3 Sheets-Sheet 3

Witness:
S. S. Grotta

Inventor:
Karl E. Peiler
by W. H. Honiss,
Atty.

Patented Aug. 19, 1930

1,773,544

UNITED STATES PATENT OFFICE

KARL E. PEILER, OF HARTFORD, CONNECTICUT, ASSIGNOR, BY MESNE ASSIGNMENTS, TO HARTFORD-EMPIRE COMPANY, A CORPORATION OF DELAWARE

ART OF FEEDING MOLTEN GLASS

Original application filed August 3, 1912, Serial No. 713,143. Divided and this application filed March 7, 1916. Serial No. 82,654.

This invention comprises improvements in the art of feeding molten glass in separated masses or gathers in suitable plastic condition for subsequent shaping operations.

This invention is especially desirable and useful in connection with automatic or semi-automatic machines for pressing and blowing glassware, in which it is important to feed the molten glass to a mold, or to successive molds, in "gathers" of uniform size and at uniform intervals of time and in synchronism with the machine.

The inherent viscosity and other peculiar properties and characteristics of molten glass impose special and peculiar difficulties upon the work of separating it into uniform masses, delivered in regular and reliable succession at predetermined intervals of time. The molten glass adheres tenaciously to feeding or gathering implements unless the latter are kept so cool as to injuriously chill the glass. On account of this viscous and tenacious character of the glass, its separation into masses or "gathers" tends to draw it more or less unequally and irregularly into cords or threads, which chill quickly and further increase the difficulty of separating the masses uniformly, and of maintaining them in the uniformly heated and plastic condition which is desirable for pressing, or blowing, or otherwise shaping them to best advantage.

According to the present invention, the molten glass flowing from the outlet of a melting furnace or other receptacle is wound or coiled or rolled upon itself until the desired amount of glass is accumulated, whereupon the winding or coiling operation is partly or wholly arrested or reversed, or otherwise varied so as to shed or discharge the accumulation, the separation being aided if desired by any suitable severing device. These alternate accumulating and shedding operations are repeated, and regulated as to rapidity of occurrence and the amount of glass fed, by suitably adjusting the rate of flow of the glass and the frequency of the shedding operations.

This invention may be applied in practice in various ways, one of which is illustrated in the accompanying drawings in connection with an approved form of apparatus, in which the molten glass is flowed from a melting tank or furnace, or other source of supply to a rotary gathering or accumulating head, until the latter has accumulated the required quantity of glass, when by slowing or stopping or reversing the rotations of the head its accumulated "gather" of glass is allowed to sag or slump down and form a drop or globule suspended below the head by a diminishing neck or thread, which sheds and parts itself, or is severed by a shear or other severing device. The gathering head is then again rotated, thus winding up the glass thread or stub attached to it and also accumulating another supply to form the succeeding drop or "gather." Thus by maintenance of a regular flow of the molten glass, its accumulation upon the gathering head and its suspension and severence therefrom at regular intervals, charges or gathers of glass of uniform size are produced at uniform intervals of time. These may be delivered by any suitable means to the mechanism by which it is to be shaped or otherwise acted upon, the time of operation of the shaping mechanism and of the feeding devices being suitably synchronized with each other.

This application is a division of my prior application Serial No. 713,143, filed August 3, 1912.

Figure 12:
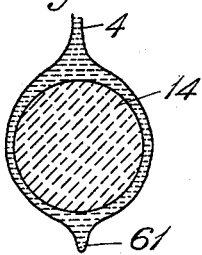
Figure 6:
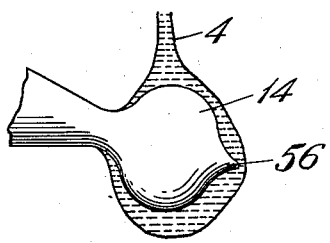
Figure 7:
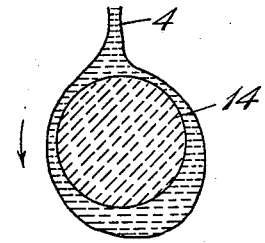
Figure 13:
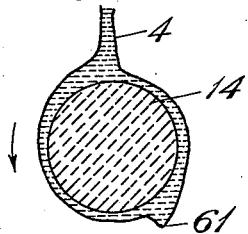
Figure 14:
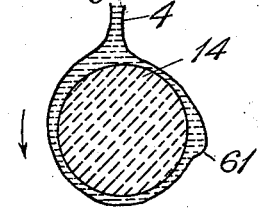

Figure 1 of the drawings is a front view of the apparatus refered to, in section taken on the line 1—1 of Figs. 2 and 3. Fig. 2 is a side view projected from Fig. 1 and in section taken on the line 2—2 of Fig. 3. Fig. 3 is a plan view in section taken on the line 3—3 of Fig. 1. Figs. 4 to 14 inclusive are detail views in larger scale, showing the gathering head at successive stages in its operation. Figs. 4, 6, 8, and 10 are side views showing the different stages of accumulating the glass upon and shedding it from the gathering head, the glass being shown in section taken approximately through the longitudinal center of the head, the latter not being shown in section. Figs. 5, 7, 9 and 11 are end views projected from Figs. 4, 6, 8 and 10, respectively, and are shown in cross-section taken substantially across the largest diameter of the gathering head. Figs. 12, 13 and 14 are additional end views, especially illustrating the winding up and absorption, into the next accumulation, of the thread or cord or stub from which the previous accumulation was severed. Figs. 15 and 16 are detailed views showing a part of the drive for the punty.

The glass melting tank or furnace 1 containing the supply of molten glass 2 is provided with an outlet spout 3 along which a stream 4 of the molten glass flows. A gate 5 made of refractory material, for regulating the size of the stream, and for stopping it altogether when necessary, is herein shown to be suspended from a bracket 6 by means of a rod 7, threaded nuts 8 or any suitable device being used for adjusting the size of opening beneath the gate. The spout 3 is preferably enclosed by a hood 9, also of refractory material, for confining the heat and maintaining the flowing stream in a suitable heated condition. One or more gas jets 10 are also preferably provided as shown in Fig. 2, for maintaining a suitable and regulated degree of heat within the hood. The walls of the hood extend down far enough to form a hot chamber enclosing the accumulating drops or gathers, the chamber being large enough to allow the drops or gathers to accumulate to the required size without touching the walls of the chamber, and to leave room for a hot gaseous envelope to surround the gathers or "gobs", as they are sometimes named.

The stream of molten glass 4 flows from the end of the spout upon a rotary gathering or accumulating head 14, which is herein shown projecting through an opening in the side of the hood, the parts exposed to the heat being made of suitable refractory material. The head 14 is carried by a suitable stem or shaft 15, which is mounted for rotation in the bracket 16, or any other suitable frame, which may be appurtenant to or integral with the general structure of the furnace. The shaft 15 is provided with a friction roller 17, through which rotary motion is communicated to the head from a friction disc 18, which is mounted upon a shaft 19 journaled in a bracket 20 and is driven by means of a belt applied to the pulley 21 from any convenient source of power.

The rotative speed of the gathering head may be varied by changing the size of the pulley 21, or the relative size of the friction roller 17 and disc 18, or in any other convenient way.

In order to produce intermissions in the rotation of the gathering head, to allow the accumulated gathers to become suspended and severed therefrom, the peripheral driving surface of the friction disc 18 is interrupted as shown at 22 in Fig. 2, the relative length of the driving surface and of its interruption being proportional to the respective periods required for gathering and discharging drops or gathers of the required size to form a mold charge. Obviously this will depend upon the size of the stream of glass flowing to the head, and the frequency of the operations. The size and form of the head should be properly adapted to these conditions.

For convenience in thus proportioning and altering the alternating periods of rotation and rest of the gathering head, the friction disk is preferably made in two adjustable parts as shown in detail in Figs. 15 and 16, clamped together by a bolt 66 passing through a slot 68 in the disk 64, which permits these disks to be adjusted circumferentially relative to each other, so as to vary the lengths 67 of the circumferential interruption and thereby correspondingly vary the periods of intermission during which the gathering head rests from its rotation.

For all purposes now contemplated it is considered permissible and preferable thus to entirely interrupt the rotation of the gathering head during the discharging operation, and since this can be accomplished by the simplest forms of driving devices, it is thus illustrated herein. It will be obvious, however, that this is due to the availability of simple mechanism rather than to the requirement of the operation itself, since for the discharge of the glass it is only necessary to retard the rotations of the head sufficiently to enable the glass to slip down over the surfaces of the head faster than those surfaces carry the glass up. Therefore in possible instances wherein it may be found preferable thus to merely slacken the rotations of the head, or even to reverse them, as above suggested, either of these may be accomplished by various well-known and comparatively simple forms of mechanism.

In instances where sufficient time can be allowed, shear mechanism may be dispensed with and the suspended drop be permitted to separate itself from the gathering head by its own weight, which may be aided by restarting the head earlier, thereby winding up and attenuating the thread, to make its severence more definite and uniform. But for best results I prefer to employ means, which may be of any well-known form, for severing the drops or globules of glass. The severing means shown herein comprises a pair of shears, the blades 27 and 37 of which are pivotally mounted upon a common center. The lower blade 27 is fixed upon a collar 28, appurtenant to a sleeve 29, which extends downwardly through and has a bearing in the bracket 30, the lower end of the sleeve having upon it a bevel gear 31 meshing with the driving bevel gear 32 upon the shaft 33 journaled in the bracket 34. The upper blade 37 is secured to the collar 38, fixed to the shaft 39, which extends through and is journaled in the sleeve 29 and has fastened upon its lower end the bevel gear 40. Oscillating movement is communicated to the shaft 33 and its driving gear 32 by means of an arm 42, to which is pivoted a connecting rod 43 having upon its upper end a cam roll or pin 44 running in a cam groove 45 in the face of the cam 46, which is secured to and turns with the shaft 19. As a means of guiding the upper end of the connecting rod, it is here shown to be provided with a slot 47 through which the shaft 19 passes, a collar 48 being employed upon the outer side of the rod to retain it in position against the cam.

The drop or gather of glass after being severed from the head may fall directly into the mold or other receptacle for which it is intended, in case the construction and arrangement of the associated machinery enables this to be done; or, as shown in Fig. 1, the severed drop may fall upon transporting means such as a chute 51 supported by a cross bar 52, to which the chute may be pivotally clamped at 53 to permit the chute to be inclined at the proper working angle. The delivery end of the chute may extend to and above a mold 54, or succession of such molds, upon a mold supporting table 55, or to any other arrangement to which the glass is to be delivered.

The rotary gathering head is here shown to be in the general form of a spheroid, the axis of which is preferably inclined, as shown in the drawings, to overcome the tendency the glass would otherwise have of flowing along the stem or shaft 15. The head is supported at one of its poles by its connection with its stem or shaft 15. Its opposite pole is preferably provided with a polar protuberance 56, especially when the gather is likely to be large, relative to the surface of the head. This protuberance insures a more uniform distribution of the accumulating glass around the surface of the head, and appears to hold back the glass from flowing across that polar portion of the head during its rotating and accumulating period.

The form and disposal of the accumulations of glass are obviously determined by the size and form of the head, and its disposal, relative to the plane of the winding on action.

Figure 8:
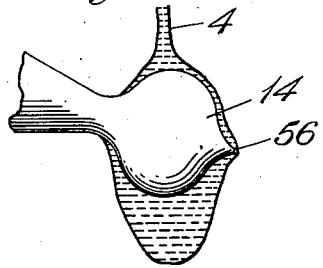
Figure 9:
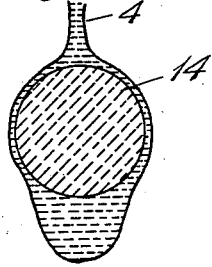
Figure 10:
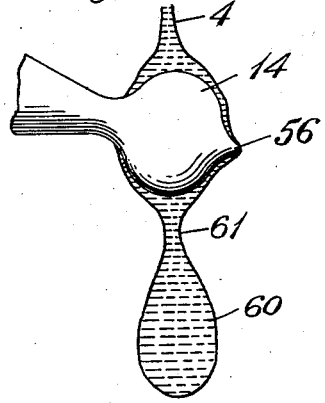
Figure 11:
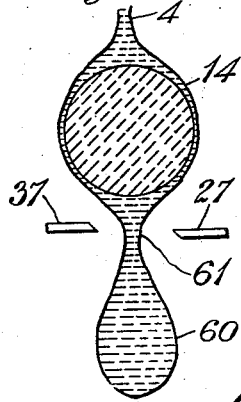

In the operation of this invention, the stream of molten glass flowing against or upon the revolving surface of the head and flowing thence sidewise toward the polar portions of the head is thus wound around the surface and accumulates thereon as indicated by comparison of Figs. 4 to 7 inclusive. When a sufficient amount of molten glass has thus been accumulated by the head, its rotation is slackened or stopped and the glass at once begins to sag downwardly thereon as shown in Figs. 8 and 9, the greater portion of the glass thereon forming a pear shaped drop 60, as shown in Figs. 10 and 11, suspended from the head by an attenuating cord or thread 61, which if left to itself would be drawn out and severed by the weight of the drop. To avoid the formation of fine and extended threads and also to increase the rapidity and uniformity of operation, severing means are preferably employed, such as the shears illustrated and described herein, which sever the attenuated neck at regular intervals and thus separate the drop from the portion above it, the drop falling into or upon the chute, or being otherwise taken care of, as may be desired. This leaves the head, with the glass remaining upon it, and whatever amount of glass has flowed upon it during the severing operation, in approximately the condition shown in Fig. 12. Practically coincident with the severing operation, the head resumes its rotation, thus winding up and absorbing the severed stub end of the thread 61 as shown in Figs. 13 and 14, and thus continuing the accumulation of another drop as illustrated in Figs. 4 to 7 inclusive.

The size of the drops formed may be varied by varying the volume or the rapidity of flow of molten glass to the head, or by varying the length of the interval from one stopping and severing operation to the next. The size of the head, its rotative speed, the time of the pause and the time of rotation may each or all be varied to give the desired results. Instead of stopping the head altogether to allow the glass to sag down and form the drop its rotative speed may be merely diminished so that the glass upon the head flows down faster than it is carried up again by the rotating movement. Or the direction of rotation of the head may be reversed to allow the drop to shed, and in this case the reversed direction may be continued for the succeeding gather.

The supply of glass may be made to flow against or upon the head either by gravity or in any other available way.

It is considered preferable to provide a hood and gas jets, or other means, for heating the interior of the hood as herein shown, since this prevents undue chilling of the glass drop or gather, maintaining it in uniform plastic condition. It also serves to prevent undue chilling of the attenuated neck of the drop, and serves to keep hot or to reheat the remaining stub of glass left by the severing operation. The shear device may be of any suitable kind, and its blades may be protected from the heat when in their open or inactive position by means of shields of suitable refractory material. Or the shear blades may be opened wider or withdrawn during their inactive period far enough from the head to avoid being overheated.

The size and form of the gathering head 14, the angle of inclination of its axis, and the rate, direction and variance of its rotation may be modified to suit different requirements. The other features of the apparatus may also be modified and varied in size, proportion, and disposal relative to each other, to suit different circumstances or conditions of service.

In my application Serial No. 713,143 filed August 3, 1912 (of which this is a division) I make claims directed to the rotating gathering member without recital of the shears and without limitation to varying the rotation of the gathering member, or results produced thereby.

I make no claims in this application directed broadly to a use of the heated chamber, as I reserve this subject matter for other applications filed by me and copending with this application, but I limit the claims involving the use of a heated chamber to the combination of the heated chamber with specific devices of this application.

I claim as my invention:—

1. The method of separating molten glass into mold charges, which includes the steps of discharging the glass through an outlet, suspending the discharged glass in successive masses by its adhesive contact with a support spaced below the outlet and shearing a mold charge from each suspended mass at a plane spaced below the support.

2. The method of separating molten glass into mold charges, which includes the steps of discharging the glass through an outlet, periodically retarding the downward movement of the issued glass by its adhesive contact with a support below the outlet to form a succession of suspended masses of the glass, and shearing a mold charge from each suspended mass.

3. The method of separating molten glass into mold charges, which includes the steps of discharging the glass through an outlet, periodically retarding the downward movement of the issued glass by its adhesive contact with a support below the outlet to form a succession of suspended masses of the glass, shearing a mold charge from each suspended mass, and raising the stub of glass left by each shearing operation.

4. The method of separating molten glass into mold charges, which includes the steps of discharging the glass through an outlet, periodically retarding the downward movement of the issued glass by its adhesive contact with a support below the outlet to form a succession of suspended masses of the glass, shearing a mold charge from each suspended mass, and incorporating in a succeeding mass the stub of glass left by each shearing operation.

5. The method of separating molten glass into mold charges, which includes the steps of discharging the glass through an outlet, accumulating and suspending the glass in successive compact masses by acting periodically directly on the glass below the outlet and independently of the glass above the outlet, and severing a mold charge from each suspended mass.

6. Apparatus for separating molten glass into mold charges, comprising a container for the glass having a discharge outlet, shears operating to sever the mold charges from the discharged glass periodically, and movable means, external to said outlet, and operating in timed relation to the shear operations for controlling the accumulation and suspension of successive masses of the discharged glass independently of conditions within the container, and for temporarily supporting the glass above the severing plane between the severing operations.

7. Apparatus for separating molten glass into mold charges, comprising a container for the glass having a discharge outlet, shears operating to sever the mold charges from the discharged glass periodically, and means external to said outlet for controlling the accumulation and suspension of successive masses of the glass independently of conditions within the container and in timed relation to the shear operations, and for incorporating in the succeeding mass the stub of glass left by each severing operation.

8. Apparatus for separating molten glass into mold charges, comprising a container for the glass having a discharge outlet, shears operating to sever the mold charges from the discharged glass, and movable means external to said outlet operating in timed relation to the shearing means and independently of conditions within the container for governing the periodic delivery of the glass in successive suspended masses to a position below the shearing plane and adapted to raise the stub of glass remaining after each shearing operation.

9. Apparatus for separating molten glass into mold charges comprising a container for the glass having a discharge outlet, shears operating periodically beneath the outlet to sever the glass, and means operating on the glass beneath the outlet to control its suspension in successive masses in timed relation to the operation of the shears, said means being adjustable to vary the time of beginning the suspension period of each mass relative to the time of severing of such mass.

10. In apparatus for separating molten glass into mold charges, the combination with a container for the glass having a discharge outlet, of shears operating periodically beneath the outlet, means operating beneath the outlet for timing the delivery of the glass in successive suspended masses in timed relation to the operation of the shears for severing such mass, and means for varying said timed relation.

11. Apparatus for separating molten glass into mold charges, including a container for the glass having an outlet, shears operating periodically beneath the outlet to sever the glass, control means operating beneath the outlet to control the periodic suspension and discharge of compact masses of the glass in timed relation to the operation of the shears, said control means being adjustable to vary the length of the discharge period without varying the frequency of the severing operations.

12. Apparatus for separating molten glass into mold charges, including a container for the glass having an outlet, shears operating periodically beneath the outlet to sever the glass, control means operating beneath the outlet to control the periodic discharge and suspension of compact masses of the glass in timed relation to the operation of the shears, said control means being adjustable to maintain the same length of discharge period upon increase or decrease of the frequency of the severing operations.

13. In a device for separating a stream of molten glass into mold charges, a gathering head having an approximately spheroidal form, with its axis inclined from the horizontal, and means for variably rotating the head upon its axis, for the purpose specified.

14. A feeder for molten glass, comprising a rotatable gathering head, means for constantly supplying molten glass to the said head, means for rotating the said head to alternately accumulate and discharge masses of the molten glass, and shear mechanism synchronized with the head rotating means for severing the discharging masses of glass.

15. A feeder for molten glass, comprising a rotatable gathering head, means for flowing molten glass continuously to the said head, means including an interrupted friction disk for imparting intermittent rotations to the head, and shear mechanism synchronized with the friction disk for severing the masses of molten glass during the intermissions in the rotation of the head.

16. In a device for separating a stream of molten glass into mold charges, a rotatable gathering head, and means wholly outside of said container and for rotating said head intermittently, including frictional driving surfaces having their continuity interrupted by intervals for producing the desired intermissions in the rotations of the head.

17. In a device for separating a stream of molten glass into mold charges, a rotatable gathering head and means wholly outside of said container and for rotating said head, including coacting friction members, the frictional driving surface of one of the said members being interrupted to correspondingly interrupt the rotative movement of the head and adjustable to vary the period of interruption relative to the driving period.

18. In a device for separating a stream of molten glass into mold charges, a gathering head mounted for rotation upon an inclined axis, means for directing the stream of molten glass to said head, means wholly outside of said container and for intermittently rotating said head to alternately accumulate glass thereon and to discharge it periodically therefrom in separated masses.

19. A feeder for molten glass, comprising a gathering head mounted for rotation upon an inclined axis, means for flowing a constant stream of molten glass upon said head, means wholly outside of said container and for intermittently rotating said head to alternately accumulate glass thereon and to discharge it periodically therefrom in separated masses, and means for severing the discharging masses of glass from the head in timed relation to its rotations.

20. The combination of a glass furnace having an orifice to discharge a stream of glass, a shearing mechanism in the path of flow of said stream of glass, a chamber surrounding the orifice and the glass flowing therefrom and the shearing mechanism, and means within the chamber for varying the speed of flow of the stream toward the shearing mechanism.

KARL E. PEILER.

CERTIFICATE OF CORRECTION.

Patent No. 1,773,544.　　　　　　　　　　Granted August 19, 1930, to

KARL E. PEILER.

It is hereby certified that error appears in the printed specification of the above numbered patent requiring correction as follows: Page 4, line 111, claim 9, line 122, claim 10, page 5, line 2, claim 11, line 14, claim 12, after the word "means" insert the words wholly outside of said container and; same page, lines 47 and 48, claim 16, lines 55 and 56, claim 17, lines 67 and 68, claim 18, and line 76, claim 19, strike out the words "wholly outside of said container"; and that the said Letters Patent should be read with these corrections therein that the same may conform to the record of the case in the Patent Office.

Signed and sealed this 21st day of October, A. D. 1930.

M. J. Moore,
Acting Commissioner of Patents.

(Seal)